United States Patent
Zhang et al.

(10) Patent No.: US 8,200,404 B2
(45) Date of Patent: Jun. 12, 2012

(54) CONTROLLING WHEEL HOP IN A VEHICLE DRIVELINE

(75) Inventors: Jianping Zhang, Ann Arbor, MI (US);
Joseph F. Kucharski, Livonia, MI (US);
Charles W. Suter, South Lyon, MI (US);
Daniel T. Lin, Ann Arbor, MI (US);
David M. Dillon, Canton, MI (US);
Michael J. O'Day, Dexter, MI (US);
Nicholas J. Witte, Wixom, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 382 days.

(21) Appl. No.: 12/686,542

(22) Filed: Jan. 13, 2010

(65) Prior Publication Data
US 2011/0172889 A1 Jul. 14, 2011

(51) Int. Cl.
*G06F 19/00* (2011.01)
(52) U.S. Cl. .................. 701/54; 701/84; 701/87
(58) Field of Classification Search .............. 701/54, 701/58, 82, 90, 84, 87
See application file for complete search history.

(56) References Cited

U.S. PATENT DOCUMENTS

| | | | | |
|---|---|---|---|---|
| 2,920,481 A | * | 1/1960 | Hulswit, Jr. et al. | 73/146 |
| 5,226,860 A | * | 7/1993 | Baxter et al. | 475/206 |
| 5,469,359 A | * | 11/1995 | Tsuyama et al. | 701/90 |
| 5,952,564 A | * | 9/1999 | Naito et al. | 73/115.01 |
| 6,314,342 B1 | * | 11/2001 | Kramer et al. | 701/1 |
| 7,364,003 B2 | | 4/2008 | Holt et al. | |
| 7,425,187 B2 | * | 9/2008 | Doering | 477/107 |
| 7,448,983 B2 | * | 11/2008 | Doering et al. | 477/183 |
| 7,473,209 B2 | * | 1/2009 | Todd et al. | 477/174 |
| 7,577,510 B2 | | 8/2009 | Fodor et al. | |
| 7,653,471 B2 | * | 1/2010 | Mattson et al. | 701/83 |
| 2004/0211609 A1 | * | 10/2004 | Schmitt | 180/197 |
| 2006/0080022 A1 | * | 4/2006 | Hrovat et al. | 701/82 |
| 2006/0080023 A1 | * | 4/2006 | Hrovat et al. | 701/82 |
| 2006/0191692 A1 | | 8/2006 | Holt et al. | |
| 2007/0027606 A1 | * | 2/2007 | Fodor et al. | 701/82 |
| 2008/0249689 A1 | * | 10/2008 | Matsumoto et al. | 701/48 |
| 2008/0319623 A1 | | 12/2008 | Dobkin et al. | |
| 2009/0107747 A1 | | 4/2009 | Luehrsen et al. | |
| 2009/0107748 A1 | * | 4/2009 | Luehrsen et al. | 180/197 |
| 2009/0112437 A1 | | 4/2009 | Luehrsen et al. | |

FOREIGN PATENT DOCUMENTS

GB 2455637 A 6/2009
WO WO2009002442 A1 12/2008

* cited by examiner

*Primary Examiner* — Drew Brown
(74) *Attorney, Agent, or Firm* — David B. Kelley; MacMillian Sobanski & Todd, LLC

(57) ABSTRACT

A method for controlling wheel-hop in a vehicle driveline includes detecting that a wheel-hop condition occurs upon determining an amplitude and frequency of speed oscillations of a component that transmits power to wheels of the driveline, engaging a transmission friction clutch that transmits torque in the driveline between an engine and the wheels, and modulating requested engine torque.

19 Claims, 3 Drawing Sheets

CONTROLLING WHEEL HOP IN A VEHICLE DRIVELINE

BACKGROUND OF THE INVENTION

1. Field of the Invention

This invention relates generally to the driveline of a motor vehicle, and is independent of the driven wheel configuration. For example, the motor vehicle driveline may be front wheel drive, rear wheel drive and/or all wheel drive, with or without locking differential axle(s). The invention relates more particularly to detecting and controlling wheel-hop through detection, measurement, monitoring and automatic transmission one-way clutch protection.

2. Description of the Prior Art

Wheel hop is an objectionable operating condition that occurs in the driveline of a motor vehicle. It is known that driveline torsional oscillations excite the vehicle at a characteristic frequency, the natural frequency of the system. Wheel hop is apparent when the driven wheels oscillate torsionally due to the driven wheels being in frictional contact with a road surface followed by the wheels losing contact (sometimes referred to as stick and slip). During a wheel hop condition, the vehicle's suspension system often oscillates torsionally producing vertical and angular displacements (sometimes referred to as wrap-up).

The resulting periodic driveline impact loads generated by wheel hop can potentially exceed the design limitations of many of the driveline components.

A need exists in the industry for a reliable, repetitive technique to detect, measure, monitor and protect the principal driveline components, including the automatic transmission and its internal components from damage and to avoid performance problems caused by wheel hop.

SUMMARY OF THE INVENTION

A method for controlling wheel-hop in a vehicle driveline includes detecting that a wheel-hop condition occurs by determining an amplitude and frequency of speed oscillations of a component that transmits power to the wheels of the driveline, engaging a transmission friction clutch that transmits torque in the driveline between an engine and the wheels, and modulating requested engine torque.

The friction clutch is hydraulically actuated and arranged in parallel with a one-way clutch in the driveline between the engine and the wheels. If the speed amplitude is greater than a reference speed amplitude, engine output torque transmitted to the wheels is reduced.

The method protects the driveline components against torsional impact loading, improves durability of the transmission's components, and preserves the calibration benefits of non-synchronous shift events in the transmission.

The method supports a control system strategy embedded in the automobile's powertrain control module, which can continuously detect, measure, monitor and protect the automatic transmission from adverse load conditions produce by wheel hop.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
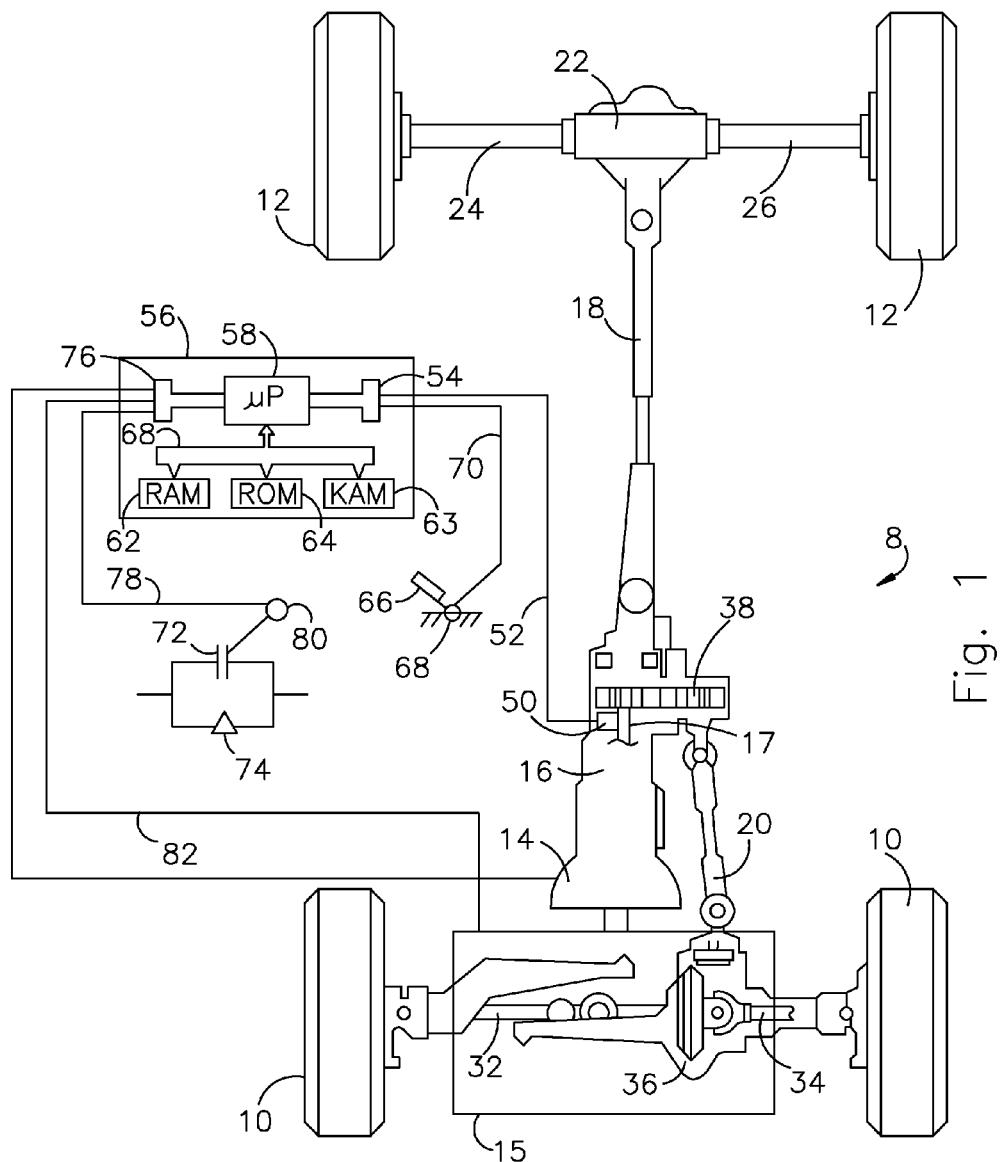
FIG. 1 is a top view of a motor vehicle driveline that includes a transmission, transfer case, front and rear drive shafts, and shafts extending to front wheels and rear wheels.

With reference now to the drawings and particularly to FIG. 1, the powertrain 8 of a motor vehicle, to which the present invention can be applied, includes front wheels 10 and rear wheels 12, a power transmission 14 for producing multiple forward speed ratios and reverse drive, an engine 15 driveably connected to the transmission, and a transfer case 16, which continuously driveably connects the transmission output 17 to a rear drive shaft 18. The transfer case 16 selectively connects the transmission output to both the front drive shaft 20 and rear drive shaft 18 when a four-wheel drive mode of operation is selected, either manually or electronically.

The rear drive shaft 18 transmits power to a rear differential mechanism 22, from which power is transmitted differentially to the rear wheels 12 through axle shafts 24, 26, which are contained within a differential housing. Often the rear differential mechanism 22 is a locking differential, which under certain conditions secures the rear axle shafts 24, 26 mutually preventing differential drive to the rear wheels 12. The front wheels 10 are driveably connected to right-hand and left-hand half-shafts 32, 34, to which power is transmitted from the front drive shaft 20 through a front differential mechanism 36.

The transfer case assembly 16 continually transmits rotating power to the rear driveshaft 18 and rear wheels 12, which is the primary power path. The transfer case 16 intermittently transmits rotating power through a transfer clutch and a chain mechanism 38 to the front driveshaft 20 and the front wheels 10, which is the secondary power path. A transfer clutch, located in the transfer case 16, is actuated and engaged to transmit power to the front driveshaft 20. When the transfer clutch is disengaged, power is transmitted from the transmission output 17 only to the rear wheels 12.

An electronic controller for controlling operation of the engine 15, transmission 14 and transfer case 16 comprises a microprocessor 56, accessible through a communication network 58 to electronic memory including RAM 60, ROM 62 and KAM 63. An output shaft speed (OSS) sensor 50 produces a continuous electronic signal representing the variation with time of the amplitude of the speed of the transmission output shaft 17. The speed signal is carried on line 52 to the input port 54 of the controller 56. A signal representing the position of an accelerator pedal 66, i.e. the degree to which the pedal is depressed, produced by sensor 68 is carried on line 70 to the controller's input port 54.

Transmission 14 includes a hydraulically-actuated friction clutch 72 and a one-way clutch 74 arranged in parallel with clutch 72. When the transmission produces certain forward gear ratios, such as first gear, and reverse drive, rotating power is transmitted through the one-way clutch 74 to the transmission output 17.

The output port 76 of controller 56 transmits various output signals, one output signal carried on line 78 to a solenoid-actuated valve that alternately engages and disengages clutch 72; another signal carried on line 82, which operates to control the magnitude of torque produced by engine 15; and multiple signals, which control operation of transmission 14 in its various speed ratios.

Figure 2:
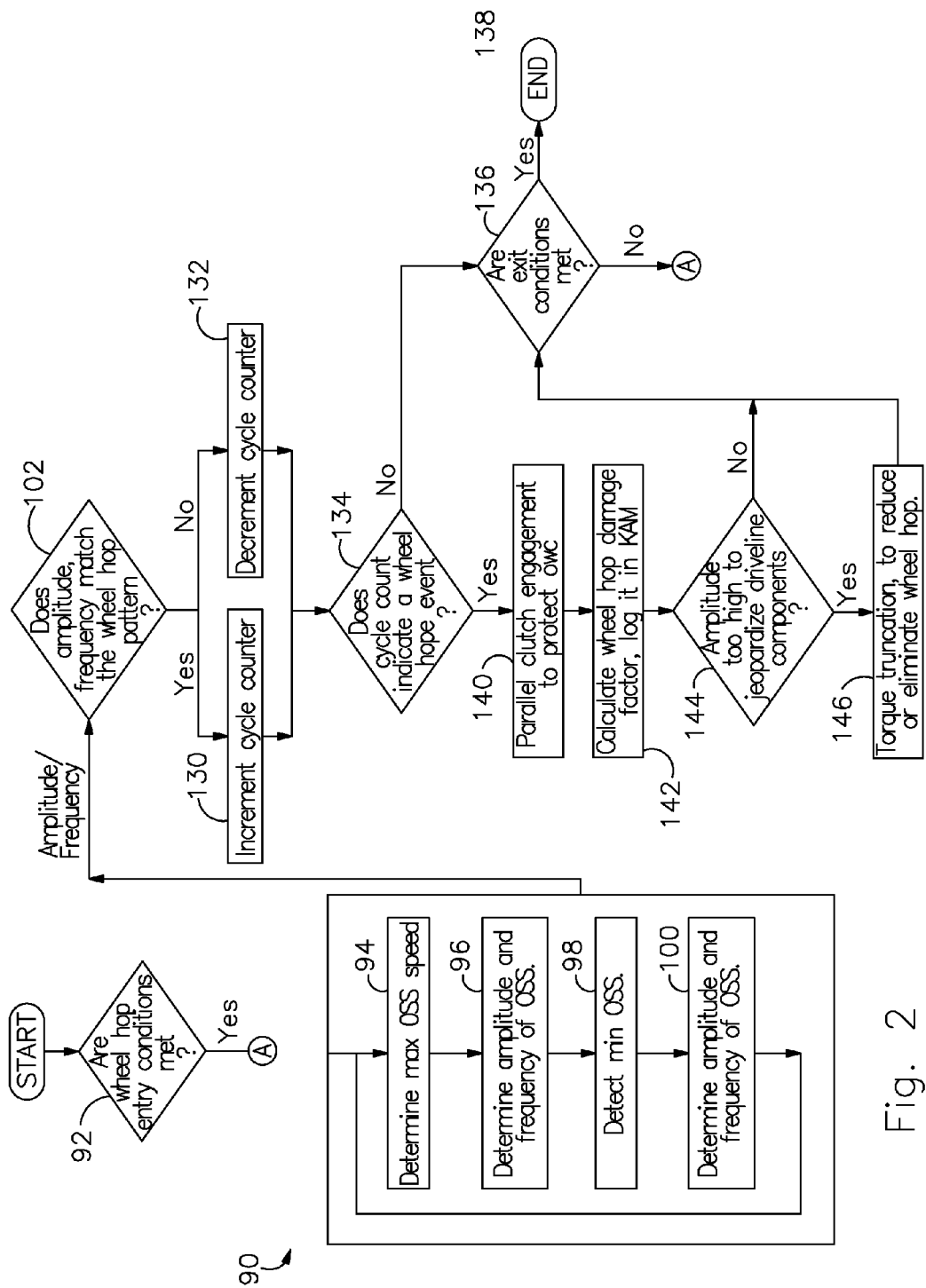
FIG. 2 is diagram showing the logic flow of an algorithm that controls wheel hop.

The controller's ROM 64 contains an algorithm 90, whose steps are illustrated in FIG. 2, which detects, controls, and modulates or eliminates wheel hop. At step 92 a test is made to determine whether certain conditions indicative of wheel hop are present. Those entry conditions include vehicle speed below a reference speed, the transmission 14 operating in a suitable gear, preferably first or second forward gear or reverse gear.

If the result of test 92 is logically false, the algorithm 90 re-executes the test at step 92. When the result of test 92 is logically true, the algorithm acquires data produced by the OSS sensor 50 data before advancing to step 102. While the algorithm is executing its other steps, step 94-100 are continually, repetitively executed and the new data are updated in RAM 62.

At step 94, a sample is taken from the signal produced by OSS sensor 50 to determine the maximum current oscillating speed of the OSS. At step 96, the sampled amplitude and frequency of the OSS are determined. At step 98 the minimum OSS is determined from the sampled oscillating OSS signal.

Figure 3:
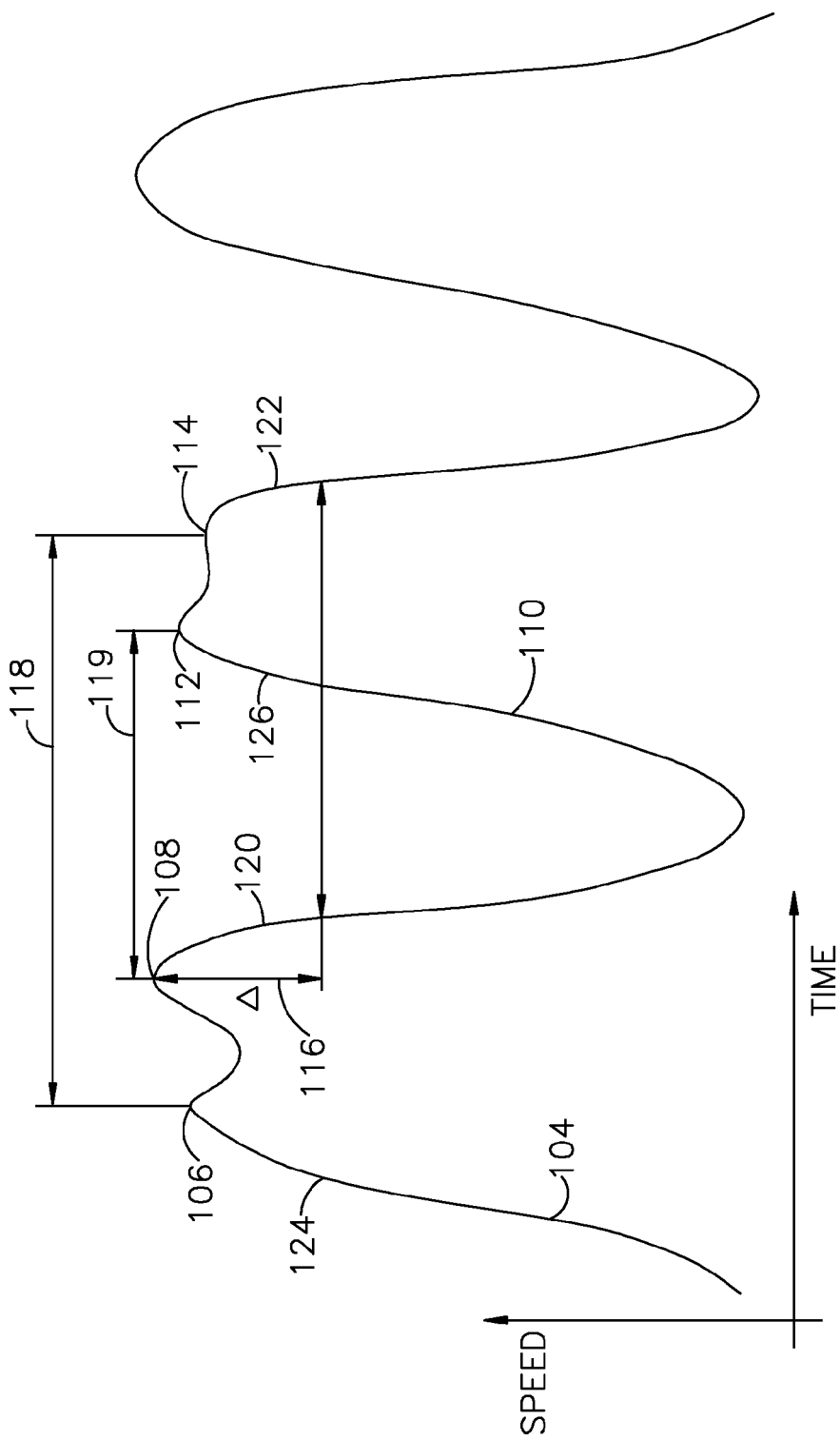
FIG. 3 is a graph that shows representative speed signal oscillations produced by an output shaft speed sensor.

FIG. 3 is a graph that shows representative speed signal oscillations produced by the OSS sensor 50. The first oscillation 104 has a first peak 106 and a second peak 108. Similarly, the second oscillation 110 has a first peak 112 and a second peak 114. The occurrence of double peaks can affect accuracy of data from which the signal's period, frequency and amplitude are determined.

To improve accuracy of the frequency data, the algorithm establishes a calibratable reference decrease in amplitude 116 that must occur during the current oscillation following each of the peak amplitudes 106, 108. When the reference decrease in amplitude 116 occurs, the immediately preceding peak is determined to be the maximum amplitude for the subject oscillation.

The occurrence of double peaks can cause a large variation in the period length 118, 119 and the corresponding frequency that can be determined from the OSS speed signal 50. To improve accuracy of the frequency data, the algorithm determines the period length from the same amplitude of either consecutive falling edges 120, 122 or consecutive rising edges 124, 126, and calculates the frequency from the period length, so determined.

At step 100, a sample is taken from the signal produced by OSS sensor 50 to determine the current amplitude and frequency of the oscillating speed of the OSS as described with reference to FIG. 3.

At step 102 a test is made to determine whether the OSS amplitude and frequency are within corresponding empirically-determined reference ranges for the subject vehicle driveline. If test 102 returns true, it indicates that oscillations of the signal produced by the OSS sensor 50 have characteristics indicative of the presence of wheel hop in the subject vehicle driveline such as amplitude, sustained cyclicality, and periodicity. The frequency of the speed signal should be within an acceptable range of the resonant torsional frequency of the subject vehicle's driveline. In a known example, that frequency range is between six and ten Hz.

If the result of test 102 is true, a wheel hop oscillation counter is incremented at step 130. If the result of test 102 is false, a wheel hop oscillation counter is decremented at step 132.

At step 134 a test is made to determine whether the current number or count of wheel hop oscillations is sufficient to conclude that a wheel hop event is occurring. If the result of test 134 is false, a test is made at 136 to determine whether conditions permitting an exit from the algorithm 90 are met. If so, execution of the algorithm terminates at step 140.

If the result of test 134 is true, at step 140 the controller causes clutch 72 to engage, thereby modulating torsional oscillations in the one-way clutch 74 and the vehicle's driveline.

At step 142, an indicator representing a change in endurance or service life of the driveline components due to the wheel hop oscillations is determined with reference to the amplitudes of the OSS signal 50 and the number of wheel hop oscillations that have occurred during the current event. Controller 56 stores the indicator in KAM 63.

At step 144 a test is made to determine whether the OSS amplitude is high enough relative to an empirically-determined reference amplitude to risk damage to the driveline components. If the result of test 144 is false, control passes to step 136.

If the result of test 144 is true, at 146 controller 56 adjusts an engine operating parameter to reduce or eliminate wheel hop. The adjusted engine operating parameter may include any engine output torque, engine airflow, engine throttle position, engine ignition timing and engine air-fuel ratio, or any combination of these parameters. Thereafter, control passes to test 136.

The exit conditions tested at step 136 include the vehicle speed being greater than a reference exit vehicle speed, accelerator pedal position being less than a reference exit pedal position for longer than a reference period, and a sustained reduction in OSS speed signal amplitude for longer than a reference period.

If the result of test 136 is false, control returns to steps 94-100.

In accordance with the provisions of the patent statutes, the preferred embodiment has been described. However, it should be noted that the alternate embodiments can be practiced otherwise than as specifically illustrated and described.

The invention claimed is:

1. A method for controlling wheel-hop in a vehicle driveline, comprising:
   detecting that a wheel-hop condition is occurring upon determining an amplitude and frequency of speed oscillations of a one-way clutch that transmits power to wheels of the driveline; and
   engaging transmission friction clutch that is hydraulically actuated, arranged in parallel with the one-way clutch, and transmits torque in the driveline between an engine and the wheels.

2. The method of claim 1, further comprising reducing engine output torque transmitted to the wheels if the speed amplitude is greater than a reference speed amplitude.

3. The method of claim 2, wherein the reducing step comprises adjusting at least one engine parameter including engine airflow, engine throttle position, engine ignition timing and engine air-fuel ratio, or any combination of these parameters.

4. The method of claim 1, wherein the driven wheels are driveably connected to a transmission output shaft and the determined amplitude and frequency are the amplitude and frequency of the output shaft speed.

5. The method of claim 1, further comprising:
- if said amplitude and frequency are in a range indicating that a wheel hop event is occurring, incrementing a counter containing a running total of wheel hop oscillations the driveline has experienced; and
- if said amplitude and frequency are in a range indicating that a wheel hop event is not occurring, decrementing the counter.

6. The method of claim 1, further comprising determining and recording a number of wheel-hop speed oscillations that occur during each wheel-hop event and the amplitude of each corresponding wheel-hop speed oscillation.

7. The method of claim 1 wherein the step of determining the amplitude of speed oscillations comprises:
- establishing a reference decrease in amplitude that must occur following each peak amplitude that occurs during an oscillation;
- when the reference decrease in amplitude occurs, determining that the amplitude of the oscillation peak that immediately precedes the reference decrease is the amplitude of the oscillation.

8. The method of claim 1 wherein the step of determining the frequency of speed oscillations comprises:
- determining at a constant speed amplitude a period length between falling edges of consecutive speed oscillations; and
- setting the frequency equal to an inverse of said period length.

9. The method of claim 1 wherein the step of determining the frequency of speed oscillations comprises:
- determining at a constant speed amplitude a period length between rising edges of consecutive speed oscillations; and
- setting the frequency equal to an inverse of said period length.

10. A method for controlling wheel-hop in a vehicle driveline, comprising:
- detecting that a wheel-hop condition is occurring upon determining an amplitude and frequency of speed oscillations of a one-way clutch that transmits power to wheels of the driveline;
- engaging a hydraulically actuated transmission friction clutch arranged in parallel with the one-way clutch and that transmits torque in the driveline between an engine and the wheels; and
- reducing engine output torque transmitted to the wheels if the speed amplitude is greater than a reference speed amplitude.

11. The method of claim 10, wherein the reducing step comprises adjusting at least one engine parameter including engine airflow, engine throttle position, engine ignition timing and engine air-fuel ratio, or any combination of these parameters.

12. The method of claim 10, wherein the driven wheels are driveably connected to a transmission output shaft and the determined amplitude and frequency are the amplitude and frequency of the output shaft speed.

13. The method of claim 10, further comprising:
- if said amplitude and frequency are in a range indicating that a wheel hop event is occurring, incrementing a counter containing a running total of wheel hop oscillations the driveline has experienced; and
- if said amplitude and frequency are in a range indicating that a wheel hop event is not occurring, decrementing the counter.

14. The method of claim 10, further comprising determining and recording a number of wheel-hop speed oscillations that occur during each wheel-hop cycle and the amplitude of each corresponding wheel-hop speed oscillation.

15. The method of claim 10 wherein the step of determining the amplitude of speed oscillations comprises:
- establishing a reference decrease in amplitude that must occur following each peak amplitude that occurs during an oscillation;
- when the reference decrease in amplitude occurs, determining that the amplitude of the oscillation peak that immediately precedes the reference decrease is the amplitude of the oscillation.

16. The method of claim 10 wherein the step of determining the frequency of speed oscillations comprises:
- determining at a constant speed amplitude a period length between falling edges of consecutive speed oscillations; and
- setting the frequency equal to an inverse of said period length.

17. The method of claim 10 wherein the step of determining the frequency of speed oscillations comprises:
- determining at a constant speed amplitude a period length between rising edges of consecutive speed oscillations; and
- setting the frequency equal to an inverse of said period length.

18. A method for controlling wheel-hop in a vehicle driveline, comprising:
- transmitting power from an engine through a one-way clutch arranged in parallel with a disengaged friction clutch to the wheels of the driveline;
- detecting that a wheel-hop condition is occurring upon determining an amplitude and frequency of speed oscillations of a transmission output that transmits power to wheels; and
- engaging the transmission friction clutch.

19. The method of claim 18, further comprising reducing engine output torque transmitted to the wheels if the speed amplitude is greater than a reference speed amplitude.

* * * * *